United States Patent [19]

Aggers et al.

[11] Patent Number: 4,657,179
[45] Date of Patent: Apr. 14, 1987

[54] DISTRIBUTED ENVIRONMENTAL/LOAD CONTROL SYSTEM

[75] Inventors: John R. Aggers, Apple Valley; Ralph C. Brindle, Minnetonka; Kenneth B. Kidder, Coon Rapids; David C. Ullestad, Brooklyn Park, all of Minn.

[73] Assignee: Honeywell Inc., Minneapolis, Minn.

[21] Appl. No.: 686,320

[22] Filed: Dec. 26, 1984

[51] Int. Cl.$^4$ .............................................. H02J 1/00
[52] U.S. Cl. ...................................... 236/51; 165/12; 307/39
[58] Field of Search ................. 236/51, 46 R; 165/12, 165/16; 307/39, 41; 364/557, 505

[56] References Cited

U.S. PATENT DOCUMENTS

| | | | |
|---|---|---|---|
| 4,228,511 | 10/1980 | Simcoe et al. | 307/39 X |
| 4,276,925 | 7/1981 | Palmieri | 165/12 |
| 4,345,162 | 8/1982 | Hammer et al. | 307/39 |

Primary Examiner—William E. Wayner
Attorney, Agent, or Firm—Charles L. Rubow

[57] ABSTRACT

A distributed environmental/load control system comprising a thermostat operable to supply signals indicative of sensed and desired values of a parameter in an environmentally controlled space to a first controller operable to control condition changing equipment for regulating the parameter, the signals being transmitted over a communications link between the thermostat and first controller. A second controller which is operable to control a plurality of loads in accordance with predetermined criteria to limit energy consumed by the loads is connected to the communications link through an interface device operable to process the signals produced by the thermostat in response to instructions furnished by the second controller and to supply the processed signals to the first controller.

5 Claims, 8 Drawing Figures

DISTRIBUTED ENVIRONMENTAL/LOAD CONTROL SYSTEM

BACKGROUND OF THE INVENTION

The invention disclosed herein relates generally to energy management apparatus, and more particularly to an arrangement in which control parameters for a closed loop environmental regulating system can be modified by instructions from a load management system having the closed loop environmental regulating system as one of several loads.

Heating and air conditioning equipment consumes substantial amounts of electrical energy. The relative scarcity and high cost of energy has made energy conservation increasingly important. Further, because the rates which electrical energy suppliers charge for electrical energy often increase as the rate of consumption increases, it has become important for users of electrical energy to manage their consumption so that peak usage rates are not exceeded, and sometimes so that rates of usage during certain times of the day are minimized.

Over the years, a large variety of methods and apparatus have been developed in attempts to control total electrical energy consumption by managing the operation of individual electrical loads. It is known to schedule the operation of major electrical loads relative to one another and/or in accordance with the time of day to even out the rate of energy consumption and/or minimize energy consumption during high energy cost times of the day. It is also known to control the duty cycle of high energy consuming loads and to coordinate the ON times of individual loads to minimize peaks in energy consumption. Another method of reducing total energy consumption is to decrease the supply voltage by a small amount. However, due to differences in factors of principal importance in environmental control loads and other types of loads, known load control systems frequently do not possess the flexibility necessary for optimum control of both types of loads.

The applicants have provided a unique distributed load control system for integrated management of a variety of loads, among which may be included one or more closed loop environmental control systems, the overall system providing great flexibility in controlling the operation of individual loads.

SUMMARY OF THE INVENTION

The invention is a distributed environmental/load control system comprising a thermostat operable to supply signals indicative of sensed and desired values of a parameter in an environmentally controlled space to a first controller operable to control condition changing equipment for regulating the parameter, the signals being transmitted over a communications link between the thermostat and first controller. A second controller which is operable to control a plurality of loads in accordance with predetermined criteria to limit energy consumed by the loads is connected to the communications link through an interface device operable to process the signals produced by the thermostat in response to instructions furnished by the second controller and to supply the processed signals to the first controller, whereby operation of the first controller may be modified in accordance with an energy conservation program.

DESCRIPTION OF THE PREFERRED EMBODIMENT

Figure 1:
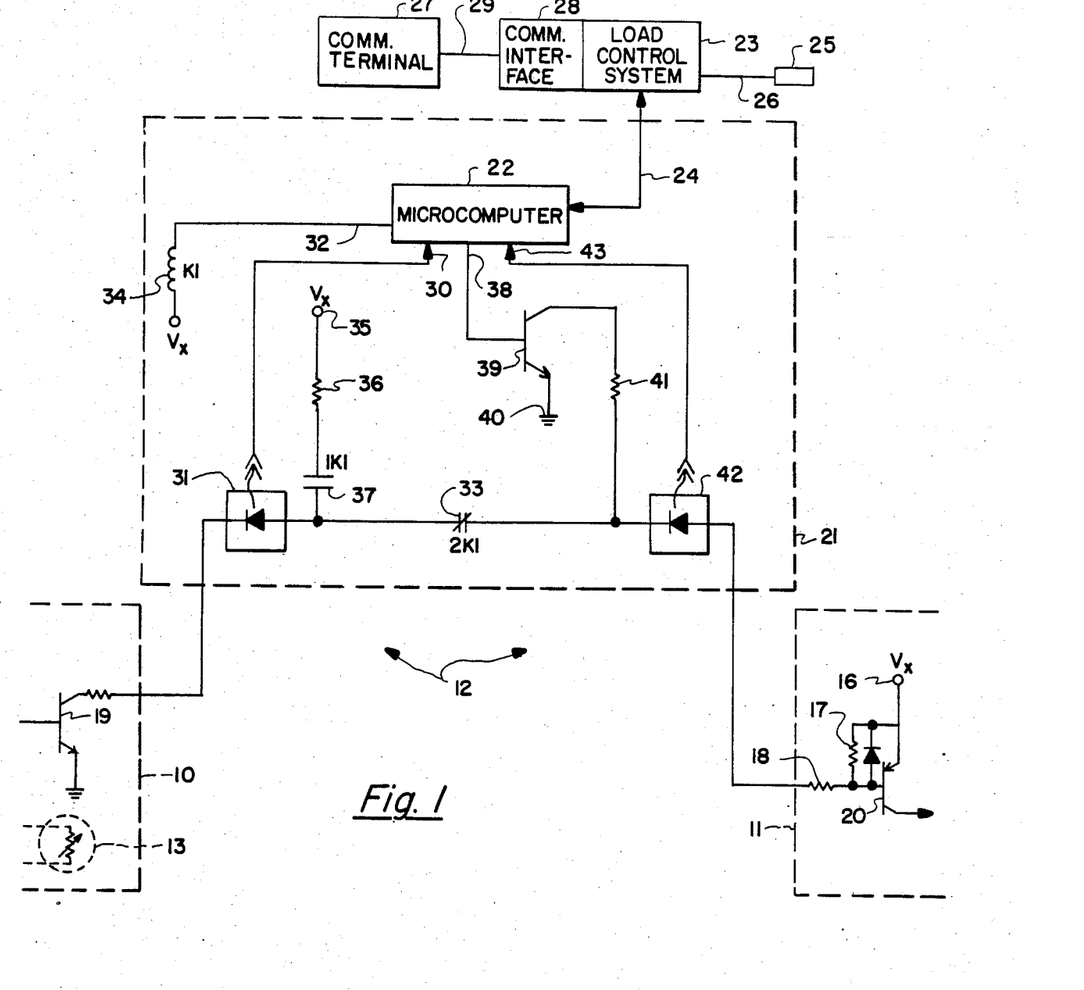
FIG. 1 is a block diagram of a distributed environmental/load control system having an adaptive setpoint adjustment feature.
Figure 2A:
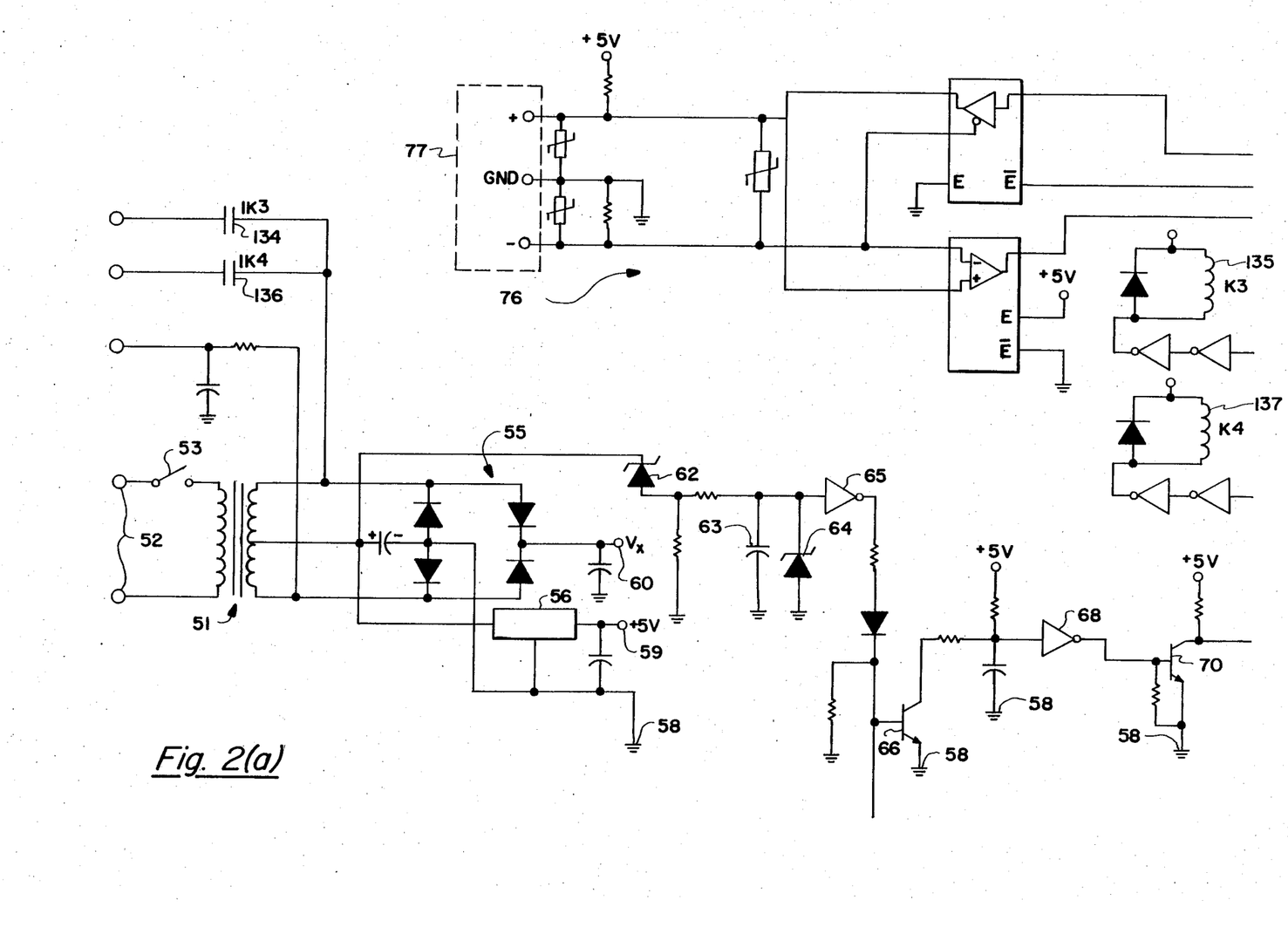
FIGS. 2(a)-2(d) together comprise a schematic circuit diagram of an interface device used in the control system of FIG. 1.
Figure 2B:
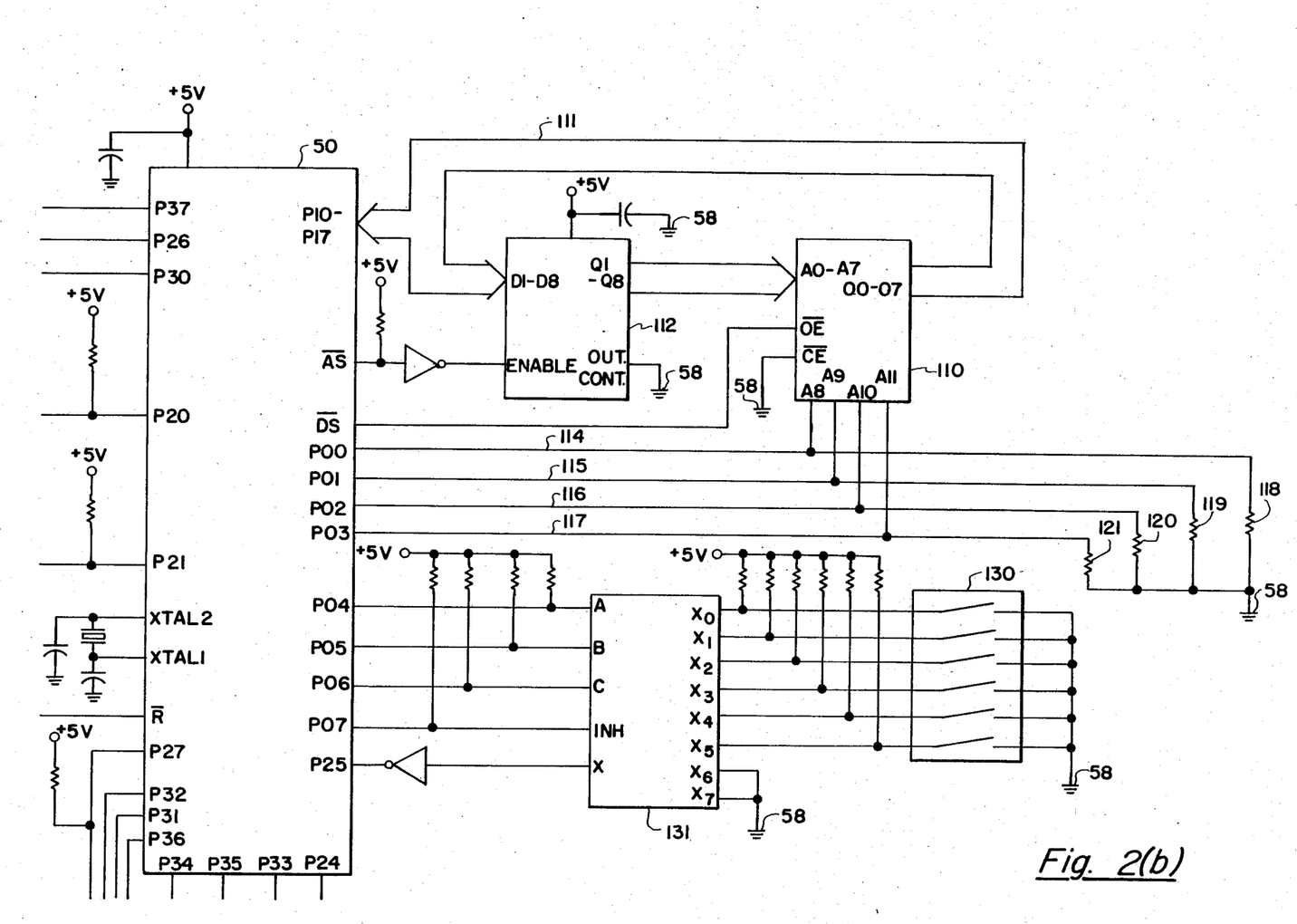
Figure 2C:
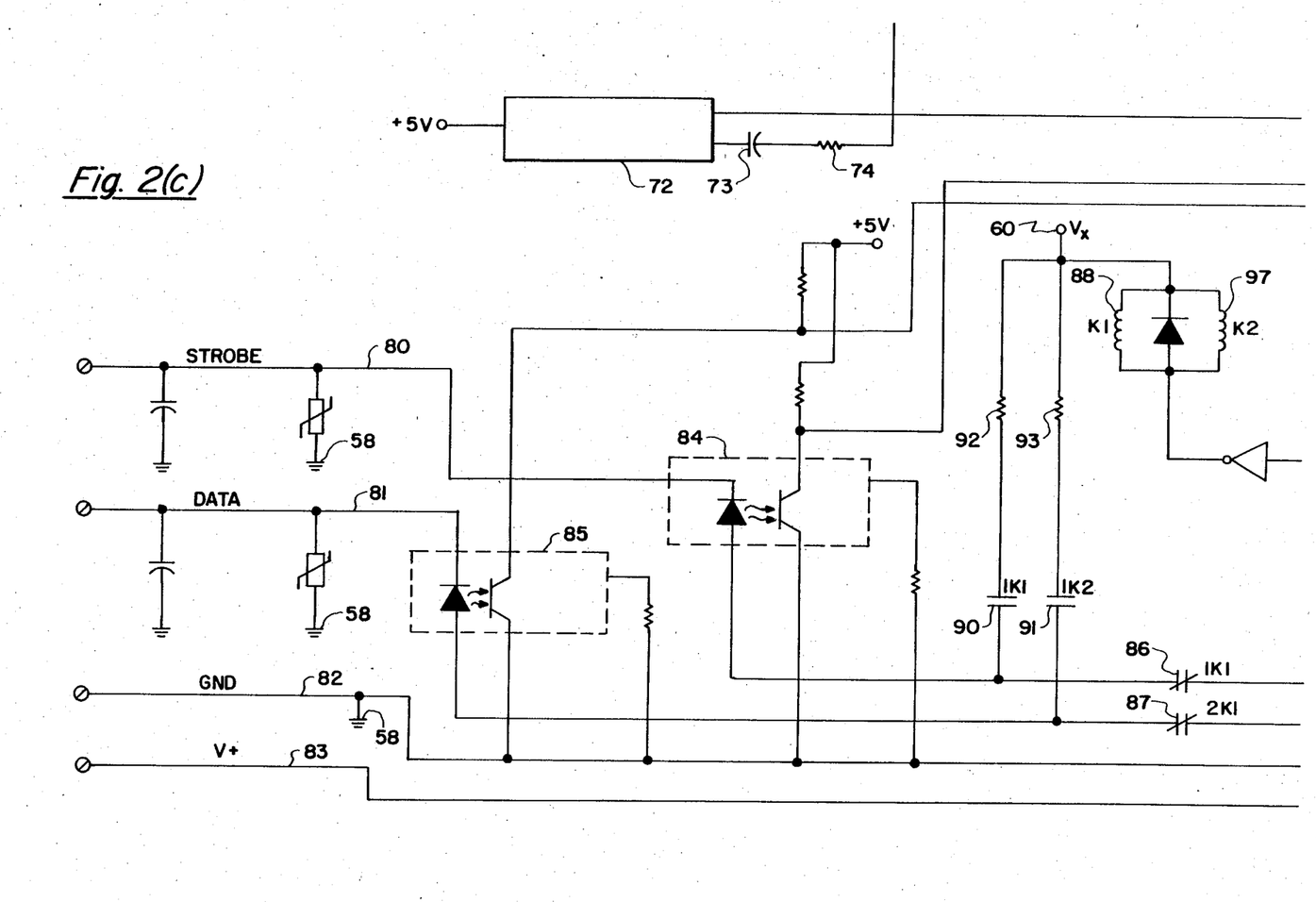
Figure 2D:
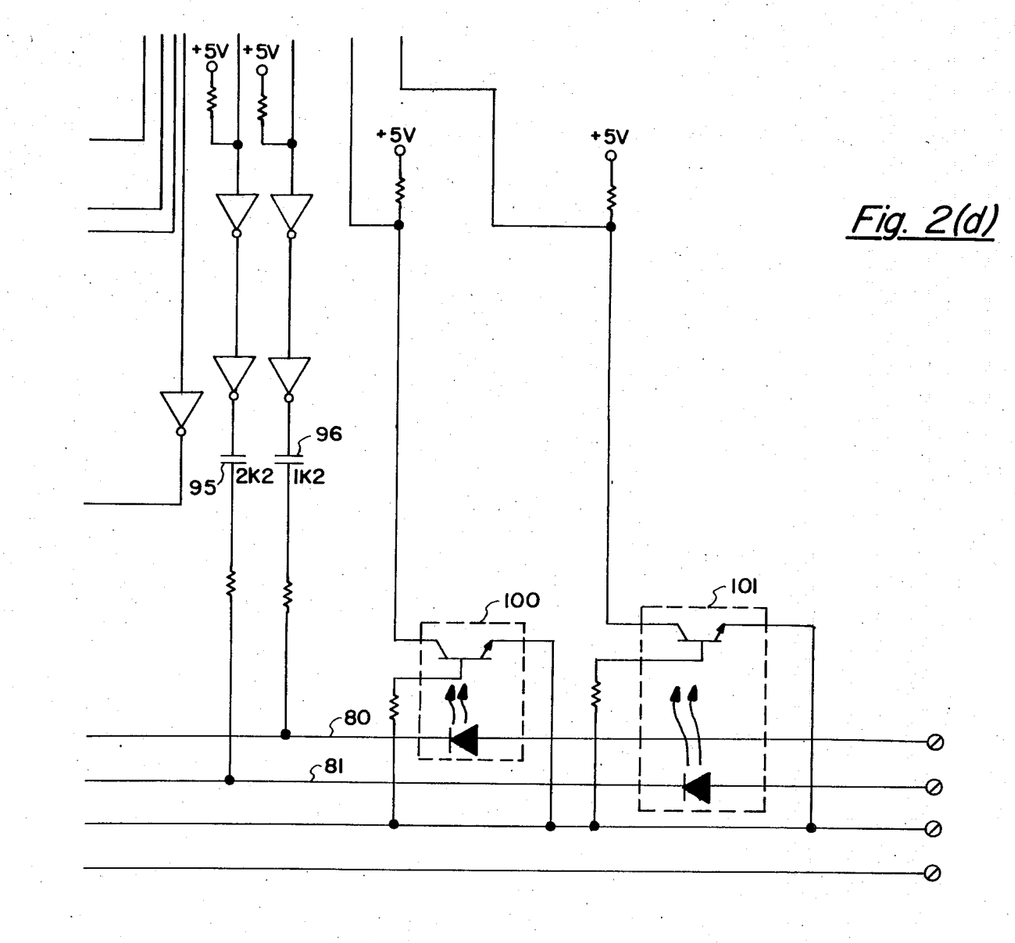

In the block diagram of FIG. 1, reference numeral 10 identifies a thermostat module intended for location in an air conditioned space. Reference numeral 11 identifies a remotely located control module 11 which is capable of providing control signals to a variety of temperature regulating equipment. Modules 10 and 11 are connected by means of a communications link generally identified by reference numeral 12. Temperature in the air conditioned space is sensed by a temperature sensing device 13 connected to a microcomputer (not shown) in module 10. As illustrated, temperature sensing device 13 is preferably located within module 10. Modules 10 and 11 may be of the type described more specifically in copending patent application Ser. No. 531,988 filed Sept. 12, 1983, now U.S. Pat. No. 4,570,448 issued Feb. 18, 1986, in the name of Gary A. Smith and assigned to the same assignee as the present application.

Communications link 12 may be of a type specifically shown and described in copending application Ser. No. 531,990 filed Sept. 12, 1983 in the names of Ralph C. Brindle and Kenneth B. Kidder and assigned to the same assignee as the present application. Briefly, the microcomputer in module 10 contains an information packet including setpoint information for the temperature regulating equipment controlled by module 11. This information packet is to be transmitted to a microcomputer (not shown) in module 11. The microcomputer in module 10 is programmed to output the information in the form of a series of groups of pulses, each group of pulses representing a separate digit in the information packet. Each group of pulses is preferably separated from each adjacent group of pulses by a strobe pulse.

Module 11 contains a current source comprising a terminal 16 connected to a power supply. Current is supplied from terminal 16 to communications link 12 through resistors 17 and 18. The current in communications link 12 is controlled by a switch 19 in module 10, the switch being controlled by the pulses representing the information packet. The train of current pulses through communications link 12 is used to control a switch 20 in module 11 which supplies a corresponding pulse train to the microcomputer in the module.

The data transmitted through communications link 12, e.g., setpoints for controlling the temperature regulating equipment, may be modified by means of an interface module identified by reference numeral 21 inserted into the communications link. Module 21 includes a microcomputer 22 which may be in communication with a load control system 23, such as the Model W7000 Load Control System produced by Honeywell Inc. Load control system 23 is capable of communicating with microcomputer 22 by means of a standard Electronic Industries Association (EIA) balanced RS-422 communications interface identified by reference numeral 24.

Load control system 23 will accept inputs from a variety of sensors, of which an outdoor temperature sensor is identified by reference numeral 25, and is connected to the load control system by means of a cable 26. Load control system 23 may be programmed and interrogated from a terminal 27 through a communications interface 28. Terminal 27 may be connected directly to interface 28, or may be remotely located and connected through telephone lines 29.

Microcomptuer 22 has a first signal input terminal 30 which is shown connected to a first optical signal coupler 31 in communications link 12. Load control system 23 may be programmed to control energy consumming loads connected thereto in accordance with a variety of criteria, such as by time of day or by energy demand limit. The thermostatic load comprising modules 10 and 11 and heating/cooling equipment controlled thereby forms one of several loads under the control of system 23.

Figure 3:
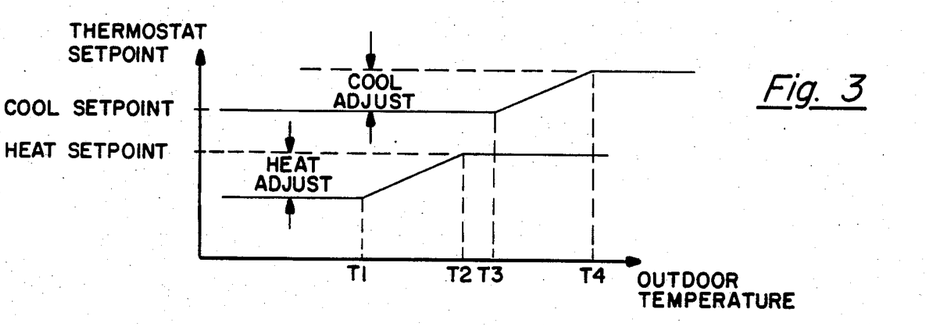
FIG. 3 is a graphic illustration of the relationship between outdoor temperature and the command temperature supplied to temperature regulating equipment in accordance with the applicants' invention.

Upon detection of a predetermined occurrance, such as reaching an energy demand limit, load control system 23 may transmit an instruction over communications interface 24 to microcomputer 22 to implement a program which will reduce energy consumption by the heating/cooling equipment. Microcomputer 22 may contain a variety of programs for modifying the data transmitted through communications link 12. The program may involve adjusting the temperature setpoints for the heating/cooling equipment controlled by module 11. The effect of one such program which will be described in detail hereinafter is illustrated in FIG. 3.

If module 21 is active and its operation has been verified, microcomputer 22 produces a switching control signal on a terminal 32 which actuates a relay K1 having a normally closed first set of contacts 33 in communications link 12. More specifically, once verified operation has been established, current is permitted to flow through winding 34 of relay K1. This serves to break communications link 12. The current normally supplied by module 11 is then supplied through terminal 35, a resistor 36 and a second set of contacts 37 of relay K1 which are closed upon actuation of the relay.

Microcomputer 22 then either repeats the signals supplied to input terminal 30 in identical form, or modifies the signals in accordance with a predetermined program, and supplies the signals at an output terminal 38. The signals on output terminal 38 control a transistor switch 39 between the end of communications link 12 connected to module 11 and ground 40 through a resistor 41. Thus, in the event temperature setpoint data is being transmitted, module 11 is supplied with signals indicative of setpoints which may be modified in accordance with a program in microcomputer 22.

A second optical signal coupler 42 is provided in the end of communications link 12 connected to module 11. The signals sampled by coupler 42 are supplied to a second input terminal 43 of microcomputer 22 in which they are compared with the input signals and/or modified setpoint signals to verify operation of module 21 and the accuracy of the modified set points transmitted to module 11.

In the interface circuit diagrams of FIGS. 2(a)-2(d), reference numeral 50 identifies a microcomputer such as a Model Z8681 manufactured by Zilog, Inc. As shown, microcomputer 50 may be equipped with an external read only memory (ROM) to allow flexibility in making software revisions. Microcomputer 50 is powered by electric current at +5 volts supplied by a power supply circuit including a transformer 51 whose primary winding is connected to a source of AC current through terminals 52 and a switch 53. Transformer 51 has a center tapped secondary winding with a full wave rectifier bridge generally identified by reference numeral 55 connected thereacross. A solid state voltage regulator circuit 56 is connected between a capacitor in the center tap conductor of transformer 51 and ground 58. Voltage regulator circuit 56 provides electric current regulated at +5 volts on terminal 59 which is connected to power a number of components in the interface circuit. An unregulated DC voltage $V_x$ is provided on a terminal 60 and used to supply current to the portion of the communications link connected to the thermostat module when the communications link is broken.

Operation of microcomputer 50 is reset by absence of a signal on reset pin R. The signal on pin R disappears when either the output voltage of the power supply circuit drops below a predetermined voltage or a malfunction is detected by a watch dog circuit connected to pin P27. More specifically, the center tap on the secondary winding of transformer 51 is connected through a Zener diode 62 to one plate of a capacitor 63 whose other plate is connected to ground. A Zener diode 64 is connected in parallel with capacitor 63. The voltage across the capacitor and diode is supplied through an inverter 65 to the base electrode of a transistor 66. A low voltage from the power supply circuit causes transistor 66 to conduct and connect the input terminal of an inverter 68 to ground, thereby raising its output voltage which causes a transistor 70 to conduct and effectively connect terminal $\overline{R}$ to ground.

Similarly, a watch dog circuit 72 monitors the repetition rate of a periodic signal on pin P27 and supplies a high output signal to the base electrode of transistor 66 through capacitor 73 and resistor 74 if the repetition rate deviates from a predetermined range. The high signal at the base of transistor 66 causes it to conduct and remove the signal from pin $\overline{R}$ in the same manner as a decrease in the power supply circuit voltage.

Reference numeral 76 generally identifies a standard 3-wire EIA communication interface circuit having connector terminals 77 to which a load control system such as system 23 in FIG. 1 can be connected. Communications interface circuit 76 is connected to pins P37, P26 and P30 of microcomputer 50. Pins 37, P26 and P30 comprise an output terminal, a disabling terminal and a receiving terminal respectively. Signals provided over communications interface circuit 76, among other things, permit user selection of one or more of several heating/cooling equipment control programs stored in microcomputer 50.

In the circuit diagram of FIG. 2, a communications link for connecting a thermostat module and a control module such as modules, 10 and 11 respectively in FIG. 1, is made up of a strobe conductor 80, a data conductor 81, a ground conductor 82 and a V+ supply conductor 83. Strobe and data conductors 80 and 81 are equipped with optical signal couplers 84 and 85 respectively. Couplers 84 and 85 provide signals to pins P32 and P31 respectively of microcomputer 50 which comprise input terminals to the microcomputer. Strobe conductor 80 is provided with a first normally closed pair of contacts 86 of a relay K1. Similarly, data conductor 81 is provided with a second normally closed pair of contacts 87 of relay K1. Relay K1 serves to break strobe and data conductors 80 and 81 when the relay is energized. The winding for relay K1 is identified by reference numeral 88 and is energized in response to a signal produced on pin P36 of microcomputer 50. Relay K1 includes further normally open pairs of contacts 90 and 91 for connecting strobe and data conductors 80 and 81 to power supply terminal 60 through resistors 92 and 93 respectively. This arrangement serves to supply the ends of strobe and data conductors 80 and 81 connected to the thermostat module with current when the current source in the control module is disconnected therefrom by relay contact pairs 86 and 87.

Data signals in the same format as received from the end of data line 81 connected to the thermostat module are produced on pin P34 of microcomputer 50. These signals may be inserted onto the end of data conductor 81 connected to the control module through a pair of contacts 95 of a relay K2. Similarly, strobe signals in the same format as supplied by the thermostat module are produced on pin P35 of microcomputer 50. This signal is inserted onto the end of strobe conductor 80 connected to the control module through a second pair of contacts 96 of relay K2. Relay K2 includes a winding 97 which is connected to be energized in unison with winding 88 of relay K1.

The ends of strobe conductor 80 and data conductor 81 connected to the control module are fitted with optical signal couplers 100 and 101 respectively. The output signals of couplers 100 and 101 are supplied to pins P33 and P24 respectively of microcomputer 50 in which they may be compared with the input signals on pins P32 and P31 respectively, or with those signals as modified by a program in the microcomputer, to verify operation of the interface circuit. If failure to supply proper signals is detected, relays K1 and K2 are deenergized, thereby reestablishing direct communications between the thermostat and control modules.

As illustrated, microcomputer 50 is a type having no self contained ROM. Thus, an external ROM 110 is provided. Microcomputer 50 is connected to ROM 110 through a port comprising pins P10-P17, a bus 111 and a latch 112. Microcomputer 50 is adapted to automatically address external ROM 110. It also uses an on board random access memory (RAM) (not shown).

In the arrangement shown, it is necessary to have greater than eight bits of address. Therefore, an additional four pins P00-P03 are configured as address pins connected to ROM 110 by means of conductors 114-117. Immediately following reset, microcomputer 50 becomes active with port P10-P17 as an address/data bus. However, since pins P00-P03 must be configured as an address bus by means of software control, these pins initially offer a high impedance. Resistors 118-121 connect conductors 114-117 respectively to ground, thereby permitting pins P00-P03 to provide a memory address.

An address strobe is produced on pin $\overline{AS}$ of microcomputer 50. This address strobe is inverted and supplied to an enable terminal of latch 112. Similarly, a data strobe is produced on pin $\overline{DS}$ of microcomputer 50 and supplied to terminal $\overline{OE}$ of ROM 110. In a typical data transfer sequence, pin $\overline{DS}$ is high, disabling output terminal 00-07 of ROM 110. When pin $\overline{AS}$ goes low, the address data at port P10-P17 of microcomputer 50 is allowed to appear at pins A0-A7 of ROM 110 through operation of latch 112.

The interface device of FIG. 2 and its associated thermostat system may be one of a number of loads connected to the load control system. This load is identified by a unique address assigned to it by means of switches 130. Signals indicative of the switch positions are supplied through a multiplexer 131 to pins P04-P06 of microcomputer 50. These pins may also be connected to receive other input signals from sources not shown. Therefore, an inhibit signal is supplied on pin P07 to block the address signals when signals from another source are being received.

The interface device of FIG. 2 provides for three modes of control, depending on the instructions supplied to microcomputer 50 and the operational status of the device. In a "local" mode, the heating/cooling equipment is controlled solely by the thermostat module. In a "remote" mode, the heating/cooling equipment is controlled solely by a user program in the load control system. In a "modify" mode, the heating/cooling equipment is generally controlled by the thermostat module, but the control signals may be modified by one or more programs in microcomputer 50. The control status may be indicated at the thermostat module by means of two light emitting diodes a subbase of the thermostat module. One such LED which indicates "modify" control is energized through a set of contracts 134 of a relay K3 whose winding 135 is energized by a signal on pin P20 of microcomputer 50. The other LED which indicates "remote" control is energized through a set of contacts 136 of a relay K4 whose winding 137 is energized by a signal on pin P21 of microcomputer 50.

One parameter which has been found useful for modifying temperature set points for heating/cooling equipment to achieve energy conservation is outside temperature. Among other programs in microcomputer 50 is a program for adjusting set points for controlling heating/cooling equipment in accordance with outdoor temperature so as to achieve energy conservation while minimizing the effect of such adjustments on inside temperature conditions. The relationship between outdoor temperature and commanded operation of heating and cooling equipment is graphically illustrated in FIG. 3.

The algorithms for achieving this operation require user entry of eight bits of information. These are heat and cool setpoint temperatures, heat and cool temperature adjustments, and reference temperatures $T1$, $T2$, $T3$, and $T4$, where $T4$ is greater than $T3$ which is greater than $T2$ which is greater than $T1$. These bits of information may be entered through communications terminal 27 shown in FIG. 1. For outdoor temperatures below reference temperature $T1$, the temperature command for the heating equipment is the heating setpoint temperature minus the heating temperature adjustment. For outdoor temperatures above $T2$, the heating temperature command is equal to the heat setpoint temperature. For outdoor temperatures between $T1$ and $T2$ the heating temperature command is ramped from the heat setpoint temperature minus the heat adjust temperature to the heat setpoint temperature.

Figure 4A:
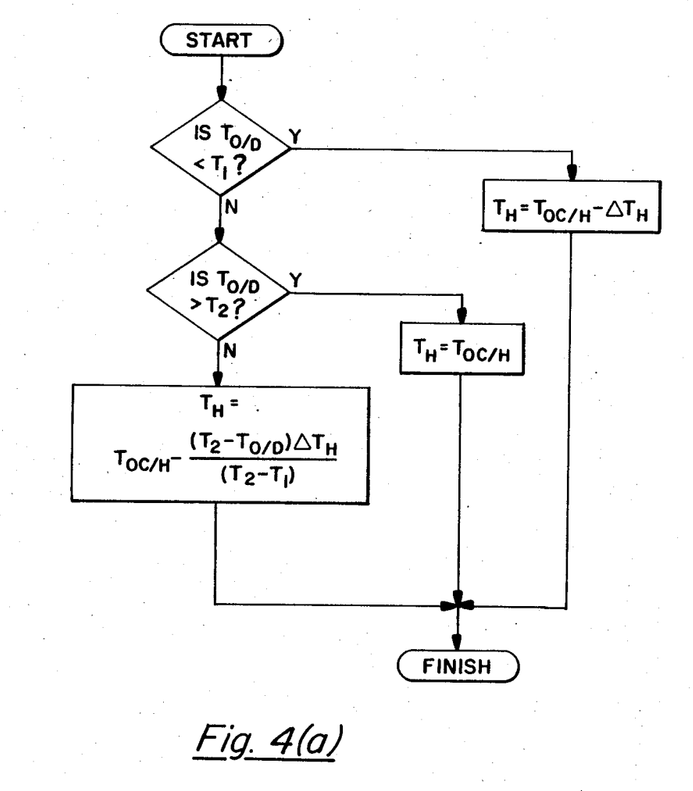
FIGS. 4(a) and 4(b) are flow diagrams of dynamic setpoint adjustment algorithms implemented in a microcomputer shown in FIGS. 1 and 2.
Figure 4B:
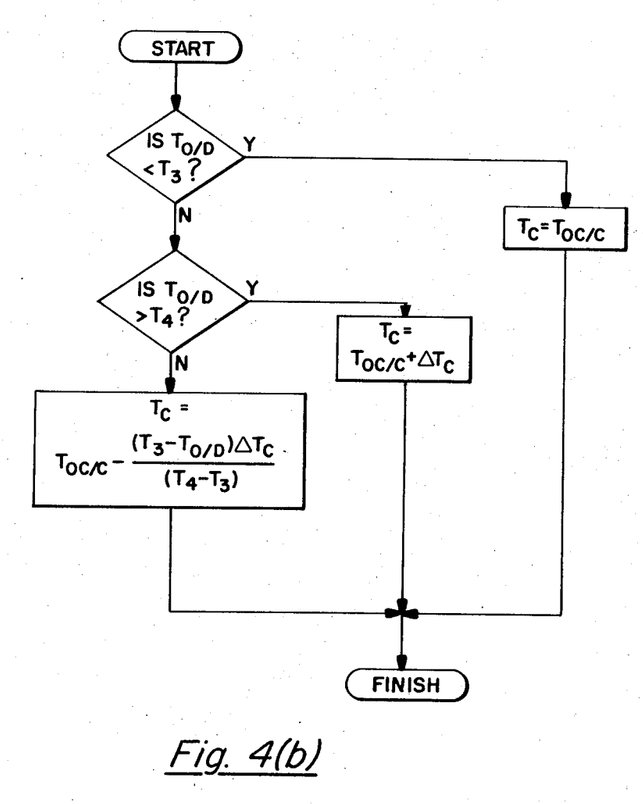

Similarly, for outdoor air temperature below reference temperature $T3$, the temperature command for the cooling equipment is the cooling setpoint temperature. For outdoor temperatures above $T4$ the cooling temperature command is the cooling setpoint temperature plus the cooling adjustment temperature. For outdoor temperatures between reference temperatures T3 and T4 the cooling temperature command is ramped from the cooling set point temperature to the cooling set point plus the cooling adjustment temperature. Flow charts of operations for producing the modified heating and cooling commands are shown in FIGS. 4(a) and 4(b) respectively.

The thermostat module may be of a type which provides separate heating and cooling set points for occupied and unoccupied periods each day. In the flow chart of FIG. 4(a) $T_{O/D}$ refers to sensed outside temperature, $T_{OC/H}$ refers to the heating set point temperature for the occupied period, $\Delta T_H$ refers to the heat adjustment and $T_H$ refers to the temperature command supplied to the heating equipment. Similarly, in FIG. 4(b) $T_{OC/C}$ refers to the cooling set point for the occupied period, $\Delta T_C$ refers to the cool adjustment and $T_C$ refers to the temperature command for the cooling equipment.

In accordance with the foregoing discussion, the applicants have provided a unique method and apparatus for modifying the control signals supplied to heating and cooling equipment as function of outdoor temperature or other parameter to achieve energy conservation. The modifications may be made selectively and from a remote location based on energy demand criteria. Although a specific embodiment of a load control system including a temperature controller with adaptive set point adjustment has been shown and described for illustrative purposes, a number of variations and modifications will be apparent to those of ordinary skill in the relevant arts. It is not intended that coverage be limited to the disclosed embodiment, but only by the terms of the following claims.

The embodiments of the invention in which an exclusive property or right is claimed are defined as follows:

1. A distributed environmental/load control system comprising:
   a thermostat including a sensor for sensing a parameter in an environmentally controlled space and adapted to produce signals indicative of the sensed and desired values of the parameter;
   a firt controller adapted to control condition changing equipment for regulating the parameter in the environmentally controlled space in response to command signals;
   a communications link between said thermostat and said first controller for supplying the signals produced by said thermostat to said first controller as the command signals;
   a second controller adapted to control loads connected thereto in accordance with predetermined criteria to limit energy consumed by the loads;
   a computer apparatus adapted to communicate with said second controller and having a first input terminal for receiving signals which may be processed in accordance with instructions from said second controller, an output terminal for supplying the processed signals, and a switching terminal for supplying a switching signal if the signals received at the input first terminal are to be processed;
   a first signal coupler for coupling the signal produced by said thermostat to the input terminal of said computer apparatus;
   a first switch in said communications link and controlled by the switching signal for breaking said communications link between said thermostat and said first controller in the event the signal produced by said thermostat is to be processed; and
   means for connecting the output terminal of said computer apparatus to said communications link on the side of said switch connected to said first controller for supplying the processed signals thereto, whereby said computer apparatus is operable to process the signals produced by said thermostat in response to instructions furnished by said second controller and to supply the processed signals to said first controller as the command signals.

2. The system of claim 2 wherein:
   said computer apparatus includes a second input terminal;
   a second signal coupler is provided for coupling the signal on the end of said communications link connected to said first controller to the second input terminal of said computer apparatus; and
   said computer apparatus is operable to terminate the switching signal if the signal coupled to its second input terminal fails predetermined tests within said computer apparatus.

3. The system of claim 2 wherein:
   said first controller includes a first current source connected to said communications link;
   said thermostat includes a switching device connected between said communications link and a current sink, the signals produced by said thermostat being produced by coded operation of said switching device so as to produce a sequence of current pulses on said communcations link; and
   a second current source is connected to the end of said communications link connected to said thermostat through a second switch controlled by said computer apparatus so as to supply current to the end of said communications link connected to said thermostat when said first switch is activated.

4. The system of claim 3 wherein said computer apparatus contains at least one program for modifying the signals produced by said thermostat and supplying the modified signals to said first controller as the command signals, the program being called up by instructions furnished by said second controller.

5. The system of claim 4 wherein said thermostat, said communications link, said interface device, said first controller, and the condition changing equipment controlled thereby form one of a plurality of loads controlled by said second controller.

* * * * *